(12) United States Patent
Susnjara (10) Patent No.: US 11,865,788 B2
(45) Date of Patent: Jan. 9, 2024

(54) METHODS AND SYSTEMS FOR INCREASING PRINT SPEED DURING ADDITIVE MANUFACTURING

(71) Applicant: Thermwood Corporation, Dale, IN (US)

(72) Inventor: Kenneth J. Susnjara, Birdseye, IN (US)

(73) Assignee: Thermwood Corporation, Dale, IN (US)

( * ) Notice: Subject to any disclaimer, the term of this patent is extended or adjusted under 35 U.S.C. 154(b) by 0 days.

(21) Appl. No.: 18/180,577

(22) Filed: Mar. 8, 2023

(65) Prior Publication Data

US 2023/0219301 A1    Jul. 13, 2023

Related U.S. Application Data

(63) Continuation of application No. 17/930,135, filed on Sep. 7, 2022, now Pat. No. 11,618,218, which is a (Continued)

(51) Int. Cl.
| | |
|---|---|
| *B29C 64/393* | (2017.01) |
| *B29C 64/307* | (2017.01) |
| *B29C 64/112* | (2017.01) |
| *B33Y 10/00* | (2015.01) |
| *B33Y 50/02* | (2015.01) |
| *B29K 105/08* | (2006.01) |

(Continued)

(52) U.S. Cl.
CPC .......... *B29C 64/393* (2017.08); *B29C 64/112* (2017.08); *B29C 64/307* (2017.08); *B29C 64/118* (2017.08); *B29C 64/364* (2017.08); *B29K 2105/08* (2013.01); *B29K 2995/0013* (2013.01); *B33Y 10/00* (2014.12); *B33Y 40/00* (2014.12); *B33Y 50/02* (2014.12)

(58) Field of Classification Search
CPC ... B29C 64/393; B29C 64/307; B29C 64/112; B29C 64/118; B29C 64/364; B33Y 10/00; B33Y 40/00; B33Y 50/02; B29K 2105/08; B29K 2995/0013
USPC ....................................................... 264/40.1
See application file for complete search history.

(56) References Cited

U.S. PATENT DOCUMENTS

| | | |
|---|---|---|
| 7,731,816 B2 | 6/2010 | Oldani et al. |
| 7,810,539 B2 | 10/2010 | Mischler et al. |

(Continued)

OTHER PUBLICATIONS

Handbook of Nucleating Agents, chapter 12, 2016, editor: George Wypych (Year: 2016).*

(Continued)

*Primary Examiner* — Joseph S Del Sole
*Assistant Examiner* — Lawrence D. Hohenbrink, Jr.
(74) *Attorney, Agent, or Firm* — Bookoff McAndrews, PLLC (57) ABSTRACT

An additive manufacturing method includes providing a polymeric material and changing a cooling rate of the polymeric material by adding a second material to the polymeric material. The additive manufacturing method also includes providing the polymeric material and the added second material to an additive manufacturing apparatus and depositing the polymeric material, having the changed cooling rate, with the additive manufacturing apparatus at a deposition rate that is based at least in part on the changed cooling rate of the polymeric material.

20 Claims, 6 Drawing Sheets

Related U.S. Application Data continuation of application No. 16/917,194, filed on Jun. 30, 2020, now Pat. No. 11,465,362.

(51) Int. Cl.
    *B29C 64/118*    (2017.01)
    *B33Y 40/00*     (2020.01)
    *B29C 64/364*    (2017.01)

(56) References Cited

U.S. PATENT DOCUMENTS

| | | |
|---|---|---|
| 8,151,854 B2 | 4/2012 | Oldani |
| 8,534,338 B2 | 9/2013 | Oldani et al. |
| 8,954,180 B2 | 2/2015 | Oldani |
| 10,037,022 B1* | 7/2018 | Vote ............... G05B 19/4145 |
| 2007/0044899 A1 | 3/2007 | Tingley |
| 2008/0006017 A1 | 1/2008 | Rindels |
| 2010/0200168 A1 | 8/2010 | Oldani et al. |
| 2016/0200047 A1* | 7/2016 | Mark ............... B29C 64/209 |
| | | 425/375 |
| 2018/0044523 A1 | 2/2018 | Rodgers et al. |
| 2018/0050502 A1 | 2/2018 | Oldani |
| 2018/0229448 A1 | 8/2018 | Bastian et al. |
| 2019/0077081 A1 | 3/2019 | Susnjara et al. |
| 2019/0344495 A1* | 11/2019 | Shuck ............... B29C 64/245 |

OTHER PUBLICATIONS https://byjus.com/jee/newtons-law-of-cooling/, Newton's Law of Cooling, last accessed Jun. 11, 2023 (Year: 2018).*

Sloan, "Big additive machines tackle large molds," Composites World, Jun. 11, 2019, (8 pages).

\* cited by examiner

METHODS AND SYSTEMS FOR INCREASING PRINT SPEED DURING ADDITIVE MANUFACTURING

CROSS-REFERENCE TO RELATED APPLICATIONS

This patent application is a continuation of and claims the benefit of priority to U.S. patent application Ser. No. 17/930,135, filed on Sep. 7, 2022, which is a continuation of U.S. patent application Ser. No. 16/917,194, filed on Jun. 30, 2020, which issued as U.S. Pat. No. 11,465,362, on Oct. 11, 2022, the entireties of which are incorporated herein by reference.

TECHNICAL FIELD

Aspects of the present disclosure relate to apparatus and methods for fabricating components. In some instances, aspects of the present disclosure relate to apparatus and methods for fabricating components (such as, e.g., automobile parts, medical devices, machine components, consumer products, etc.) via additive manufacturing techniques or processes, which may be referred to as 3D printing manufacturing techniques or processes.

BACKGROUND

Additive manufacturing techniques and processes generally involve the buildup of one or more materials to make a net or near net shape (NNS) object, in contrast to subtractive manufacturing methods. Though "additive manufacturing" is an industry standard term (ASTM F2792), additive manufacturing encompasses various manufacturing and prototyping techniques known under a variety of names, including e.g., freeform fabrication, 3D printing, rapid prototyping/tooling, etc. Additive manufacturing techniques may be used to fabricate simple or complex components from a wide variety of materials. For example, freestanding objects can be fabricated from a computer-aided design (CAD) model.

A particular type of additive manufacturing is commonly known as 3D printing. One such process, commonly referred to as Fused Deposition Modeling (FDM), comprises a process of melting a relatively thin layer of thermoplastic material, and applying this material in layers to produce a final part. This is commonly accomplished by passing a continuous thin filament of thermoplastic material through a heated nozzle, which melts and applies the material to the structure being printed. The heated material may be applied to the existing structure in thin layers, melting and fusing with the existing material to produce a solid finished product.

The filament used in the aforementioned process is generally produced using a plastic extruder, which is comprised of a specially designed steel screw configured to rotate inside a heated steel barrel. Thermoplastic material, in the form of small pellets, is introduced into one end of the rotating screw. Friction from the rotating screw, combined with heat from the barrel, softens the plastic, which is then forced under pressure through a small round opening in a die attached to the front of the extruder barrel. This extrudes a string of material which is cooled and coiled up for use in the 3D printer.

Melting a thin filament of material in order to 3D print an item may be a slow process, which may be suitable for producing relatively small items or a limited number of items. The melted filament approach to 3D printing may be too slow to manufacture large items. However, the fundamental process of 3D printing using molten thermoplastic materials may offer advantages for the manufacture of large parts or a large number of items.

In some instances, 3D printing a part may involve a two-step process. In some aspects, 3D printing may utilize a large print bead to achieve an accurate final size and shape. This two-step process, commonly referred to as near-net-shape, may begin by printing a part to a size slightly larger than needed, then machining, milling or routing the part to the final size and shape. The additional time required to trim the part to a final size may be compensated for by the faster printing process.

Print heads of additive manufacturing machines used to print thermoplastic material in relatively large beads generally include a vertically-mounted extruder and a print nozzle to direct a round print bead downward onto a surface and/or part being printed. In some cases, the flowable material, such as, e.g., molten thermoplastic material, may be infused with a reinforcing material (e.g., strands of fiber) to enhance the material's strength. The flowable material, while hot and pliable, may be deposited upon a substrate (e.g., a mold), and then pressed down, or otherwise flattened and/or leveled to a consistent thickness. These traditional print heads may include an oscillating plate surrounding the nozzle, the plate being configured to oscillate vertically to flatten the bead of material against the previous layer of material. The deposition process may be repeated so that each successive layer of flowable material is deposited upon an existing layer to build up and manufacture a desired structure for a component or part. In order to achieve proper bonding between printed layers, it may be necessary to ensure that the temperature of the previously-deposited layer is within a certain range. For example, the previously-deposited layer may need to have cooled by an appropriate amount and thereby solidified sufficiently to support the weight of the new layer. However, this previously-deposited layer may also be sufficiently warm to soften and fuse with the new layer, thus producing a solid structure.

A solid, void-free structure with complete fusion between printed polymer layers may be desirable for many applications. Void-free structures with complete fusion may be particularly desirable when producing additive manufactured items, such as molds or tools, which involve the application of vacuum during use. These types of printed structures may be generated by printing using relatively large print beads extruded in a room temperature environment. As each layer of the part is printed (e.g., as one or more large print beads), the layer, which may be exposed to the lower temperature of the air surrounding it, begins to cool. The entire bead does not, however, tend to cool at the same rate. For example, the outside of the bead may cool first, creating a cooler crust on the top or exterior surface which eventually becomes sufficiently solid to support a layer of material deposited thereon. At this point, although the outer surface of the first print layer may have cooled enough to support the subsequent layer, the interior of the first print layer may remain relatively hot and pliable.

When the next bead is printed or deposited, heat from this layer may transfer to the cooled crust on the prior bead or layer, heating and softening the outer surface of the previously-deposited bead so that the hot, newly-deposited bead is able to mix and fuse with the hot center of the previously-deposited bead. Mechanical action, such as a roller or tamping plate can assist with this mixing.

In this arrangement, the maximum speed at which printing can occur may depend on how long it takes for each printed layer to cool sufficiently to support the next layer. While it is generally desirable to print structures as quickly as possible without sacrificing part quality or integrity, conventional systems and methods typically involve waiting for the material to cool sufficiently without accelerating the cooling process. Some systems may even apply heat to an area where the material is deposited, which may further reduce the output of the system.

An exemplary approach, which may be employed on smaller 3D printers, involves the use of one or more fans to shorten the manufacturing process. These fans may move air over the printed structure in an effort to cool the structure more quickly and increase the speed of the entire print process. This approach, however, may tend to be more difficult for large printed parts because it may be difficult to provide an even flow of air over a large, and sometimes complex, printed structure. In some instances, uneven air flow may tend to create undesirable variations in the temperature of the structure as it is being printed. These temperature variations may lead to variations in the quality of the printed structure. For some parts, a highest quality may result from operation in relatively still air. Thus, alternate strategies for improving the speed of the print process, in particular for large beads, may be beneficial.

SUMMARY

Aspects of the present disclosure relate to, among other things, methods and apparatus for fabricating components via additive manufacturing or 3D printing techniques. Each of the aspects disclosed herein may include one or more of the features described in connection with any of the other disclosed aspects. An object of the present disclosure is an approach for helping layers cool faster to increase printing speed, which may decrease the time required to print a part.

An exemplary approach may include modifying the polymer being printed. An exemplary modification may include changing (e.g., increasing) the thermal conductivity of the polymer material, which may cause the printed polymer to cool more quickly.

For example, fillers, such as graphite or metal powders, or other similar materials, may be added to the polymer material. These fillers may be used in addition to fiber reinforcement material provided in the polymer (e.g., to improve material properties of the polymer such as strength), and may be formed of materials that are different than the fiber reinforcement material(s). In some aspects, the addition of graphite or metal powders may avoid limitations that may be associated with the addition of fiber reinforcement material. While graphite, metal powders, and similar materials may not tend to affect or improve physical properties, they may significantly increase thermal conductivity of the blended material. In particular, it may be possible to utilize variations of carbon fiber which have increased thermal conductivity. However, other methods or materials may be useful for increasing thermal conductivity and forming a blended polymer composite. When printed at room temperature, these modified polymer composite materials may cool significantly faster than a fiber-reinforced polymer material.

In some aspects, subsequent layers may be printed faster, and without overheating, as each deposited layer that includes the modified material may cool at a relatively faster rate.

The faster cooling rate, may, for some parts, tend to limit the overall size of part that can be printed using the modified polymer. For example, it may be desirable to print each layer of a part while the core of the previously-deposited layer is sufficiently hot to facilitate complete fusion with the new layer. This may, in some circumstances, limit the amount of time a particular polymer blend can be allowed to cool, after it has been printed and before another layer is added. For example, if a deposited layer is allowed to cool for an extended period of time, the layer may cool below a temperature that facilitates complete fusing with the subsequently-deposited layer. Thus, it may be desirable to ensure that the output (e.g., deposition rate) of the print head is sufficiently large, such that the additive manufacturing apparatus may be configured to complete (e.g., deposit) a layer of material in an available amount of time to facilitate desired fusing between layers.

In at least some aspects, a particular print head may have an associated output (e.g., maximum deposition rate) that is insufficient to complete each layer in the available amount of time. To compensate for the inability of the print head to produce an entire layer in this available time, it may be beneficial to utilize a print head having a larger output, and/or reduce the cooling rate of the polymer. Each of these strategies may increase the amount of time available to print the layer. However, as described below, it may be beneficial to adjust the thermal conductivity of the polymer being deposited or printed so that, for a particular application, the maximum cooling time available may closely correspond to the maximum output of a particular print head. In this way, the part may be printed at or near the maximum manufacturing speed of the additive manufacturing apparatus, which may correspond to the maximum output of the print head.

In at least some aspects, it may be beneficial to reduce the ambient temperature of the environment or air within a work space of the additive manufacturing apparatus such that, even in the absence of forced air circulation (e.g., fans), cooling may occur more quickly. This approach may beneficially cool the outside of the bead relatively quickly, forming a relatively thinner cooled outer surface or solid crust on an outer surface of the bead of deposited material. This relatively thin cooled outer surface may support a subsequently-deposited layer, while an interior of the deposited bead of material may maintain a relatively higher internal temperature. Thus, a subsequently-deposited bead may, when fusing with this previously-deposited bead, have less cooled material to re-melt. Additionally, the subsequently-deposited bead may encounter a center of the previously-deposited bead that has a relatively higher temperature, which may result in improved fusion between these layers.

In one aspect, an additive manufacturing method may include providing a polymeric material and changing a cooling rate of the polymeric material by adding a second material to the polymeric material. The additive manufacturing method may also include providing the polymeric material and the added second material to an additive manufacturing apparatus and depositing the polymeric material, having the changed cooling rate, with the additive manufacturing apparatus at a deposition rate that is based at least in part on the changed cooling rate of the polymeric material.

In another aspect, an additive manufacturing method may include introducing a polymeric material to an additive manufacturing apparatus and changing a cooling rate of the polymeric material by modifying a temperature of an environment of the additive manufacturing apparatus, wherein the changed temperature of the environment is lower than an ambient temperature of the additive manufacturing apparatus. The additive manufacturing method may also include depositing the polymeric material with the additive manufacturing apparatus at a deposition rate that is based at least in part on the changed cooling rate of the polymeric material.

In yet another aspect, an additive manufacturing method may include introducing a polymeric material to an additive manufacturing apparatus and increasing a cooling rate of the polymeric material by: adding a second material to the polymeric material, modifying a temperature of an environment of the additive manufacturing apparatus, or both. The additive manufacturing method may also include depositing the polymeric material, having the changed cooling rate, with the additive manufacturing apparatus at a deposition rate that is based at least in part on the changed cooling rate of the polymeric material.

BRIEF DESCRIPTION OF THE DRAWINGS

The accompanying drawings, which are incorporated in and constitute a part of this specification, illustrate exemplary aspects of the present disclosure and together with the description, serve to explain the principles of the disclosure.

DETAILED DESCRIPTION

The present disclosure is drawn to, among other things, methods and apparatus for fabricating multiple components via additive manufacturing or 3D printing techniques. Specifically, the methods and apparatus described herein may comprise an approach to facilitate layer cooling which may speed up printing and decrease the time required to print a part.

Figure 1:
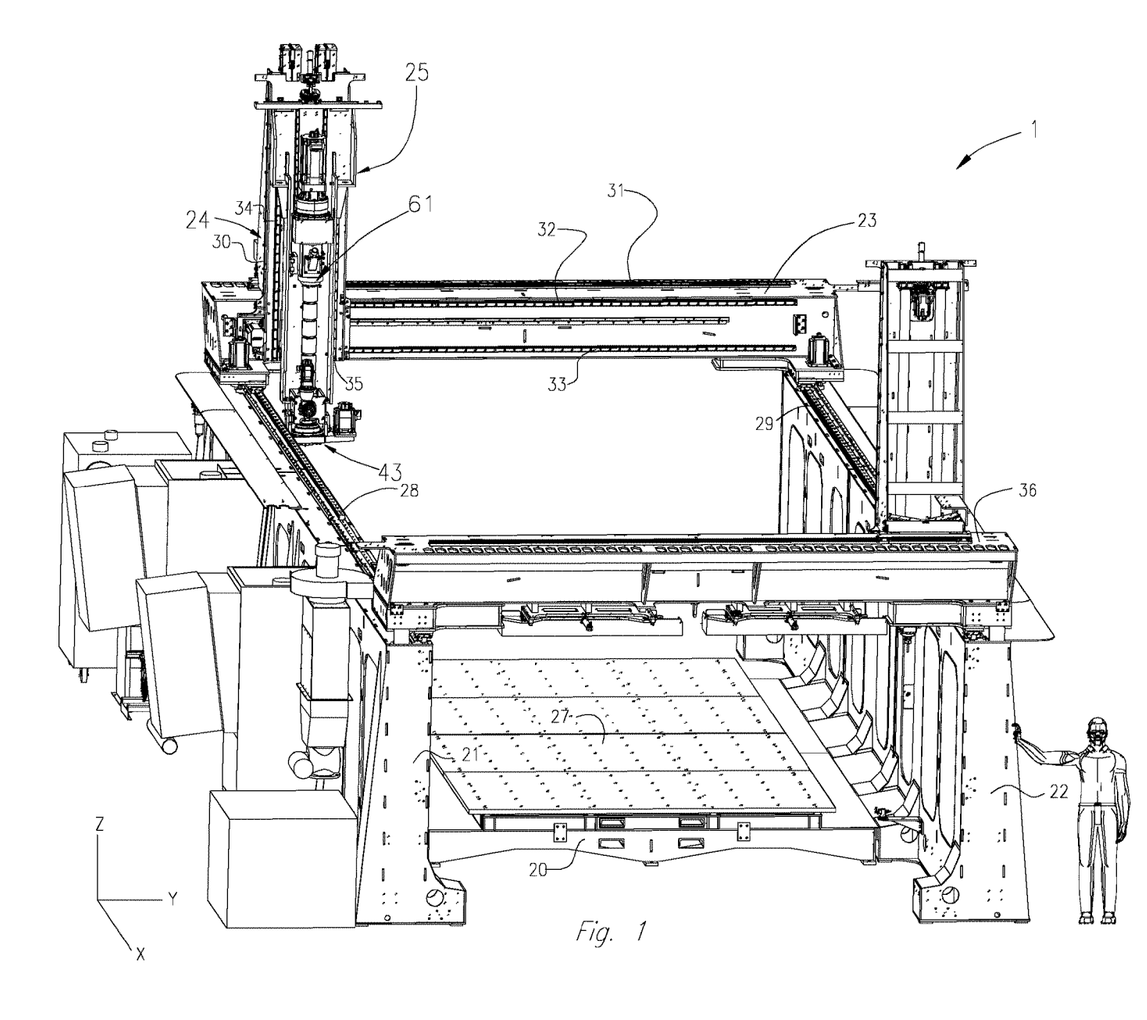
FIG. 1 is a perspective view of an exemplary CNC machine or additive manufacturing apparatus for use with an additive manufacturing process for forming articles, according to an aspect of the present disclosure.

Referring to FIG. 1, an additive manufacturing apparatus, such as CNC machine 1, may include a bed 20 having a pair of transversely spaced side walls 21 and 22, a printing gantry 23, a trimming gantry 36, a carriage 24 mounted on printing gantry 23, a carrier 25 mounted on carriage 24, an extruder 61, and an applicator assembly 43 mounted on carrier 25. Printing gantry 23 and trimming gantry 36 may be supported on side walls 21 and 22. A horizontal worktable 27 having a support surface disposed in an x-y plane may be supported on bed 20 between side walls 21 and 22. Printing gantry 23 and trimming gantry 36 may be disposed so as to extend along a y-axis, supported at respective ends thereof on end walls 21 and 22. Printing gantry 23 and trimming gantry 36 may be movable with respect to an x-axis on a set of shared, approximately parallel guide rails 28 and 29 provided on the upper ends of side walls 21 and 22. Printing gantry 23 and trimming gantry 36 may each be displaceable by one or more (e.g., a set of) servomotors mounted on the printing gantry 23 and trimming gantry 36, respectively. For example, printing gantry 23 and trimming gantry 36 may be operatively connected to tracks provided on the side walls 21 and 22 of the bed 20. Carriage 24 may be supported on printing gantry 23 and provided with a support member 30 mounted on and displaceable along one or more guide rails 31, 32, and 33 provided on the printing gantry 23. Carriage 24 may be displaceable along a y-axis along one or more guide rails 31, 32, and 33 via a servomotor mounted on the printing gantry 23 and operatively connected to support member 30. Carrier 25 may be mounted on a set of spaced, vertically-disposed guide rails 34 and 35 supported on carriage 24 for displacement of the carrier 25 relative to carriage 24 along a z-axis. Carrier 25 may be displaceable along the z-axis by a servomotor mounted on the carriage 24 and operatively connected to the carrier 25.

Figure 2:
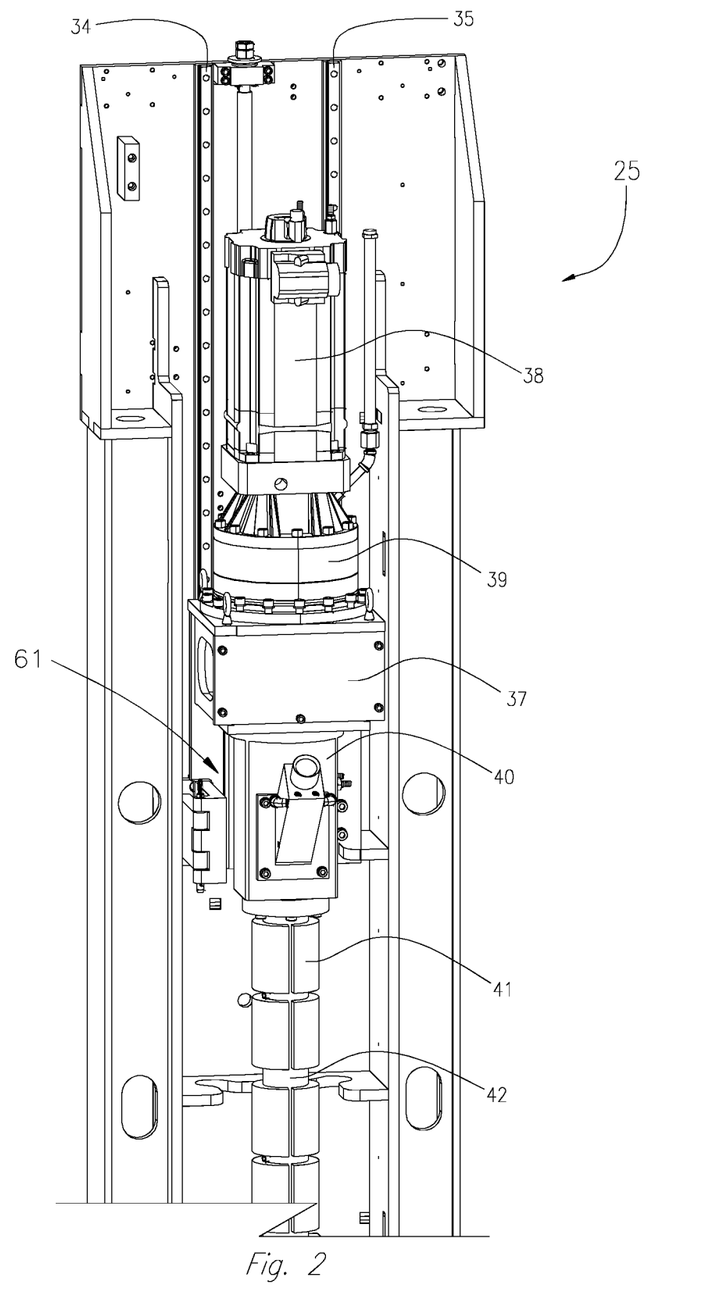
FIG. 2 is a perspective view of an exemplary carrier and extruder assembly of the exemplary additive manufacturing apparatus shown in FIG. 1.
Figure 3:
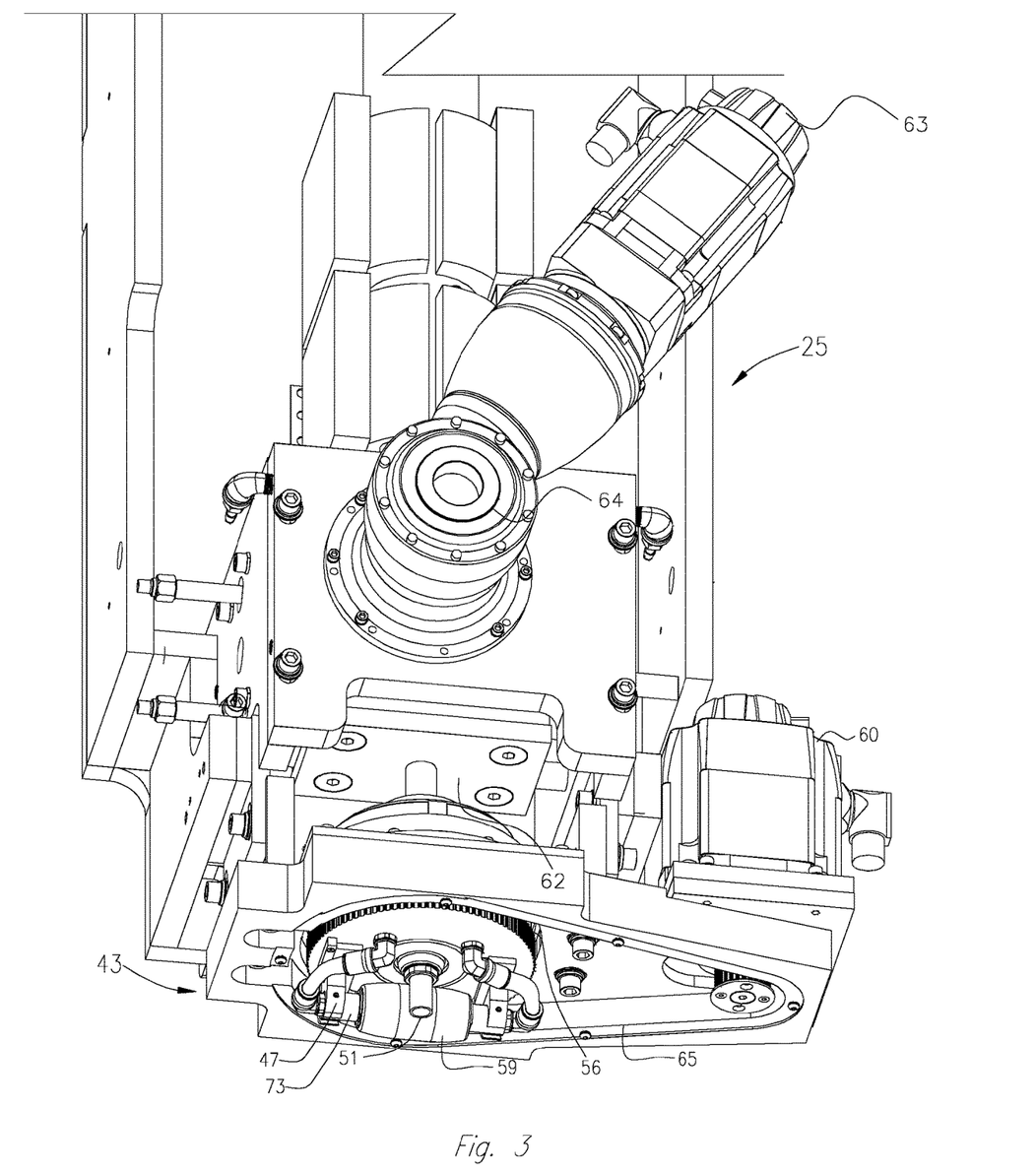
FIG. 3 is an enlarged perspective view of an exemplary carrier and applicator head assembly of the additive manufacturing apparatus shown in FIG. 1.

As best shown in FIG. 2, extruder 61 may be mounted, in a linearly-movable manner, to carrier 25. In an exemplary configuration, extruder 61 may be movably mounted on a set of rails 34 and 35 (FIG. 1) via suitable bearings. A servomotor 38 may drive an extruder screw of extruder 61 through a gearbox 39 attached to transition housing 37. Extruder 61 may receive thermoplastic pellets at the feed housing 40 so that the extruder screw transfers the thermoplastic material down through the barrel 42 where it is melted by the friction of the screw and heaters 41. This melted thermoplastic material may flow, via extruder 61, to a positive displacement gear pump or melt pump 62 (FIG. 3). A print head assembly or print head of an exemplary additive manufacturing apparatus may include one or more components that affect a maximum output (e.g., deposition rate) of the print head. For example, a print head may include a feed housing 40, extruder 61, and gear pump 62. In at least some configurations, a maximum output of the print head may be increased or decreased by replacing one or more of the components of the print head.

As best shown in FIG. 3, gear pump 62 may be securely mounted to the bottom of carrier 25. Gear pump 62 may be driven by a servomotor 63 through a gearbox 64, and may receive molten plastic (e.g., thermoplastic material, thermoplastic composite material, etc.) from extruder 61 (FIG. 2), and meter precise amounts of thermoplastic material at predetermined flow rates to nozzle 51 to print the part. An applicator head 43 may be attached at a location below gear pump 62. Applicator head 43 may include a bead shaping roller 59, rotationally mounted in carrier bracket 47. Roller 59 may provide a means for flattening and leveling an oversized bead of fluid material (e.g., molten thermoplastic) extruded out of nozzle 51. Carrier bracket 47 may be adapted to be rotationally displaced by means of a servomotor 60, through a pulley or sprocket 56 and belt or chain 65 arrangement.

Figure 4:
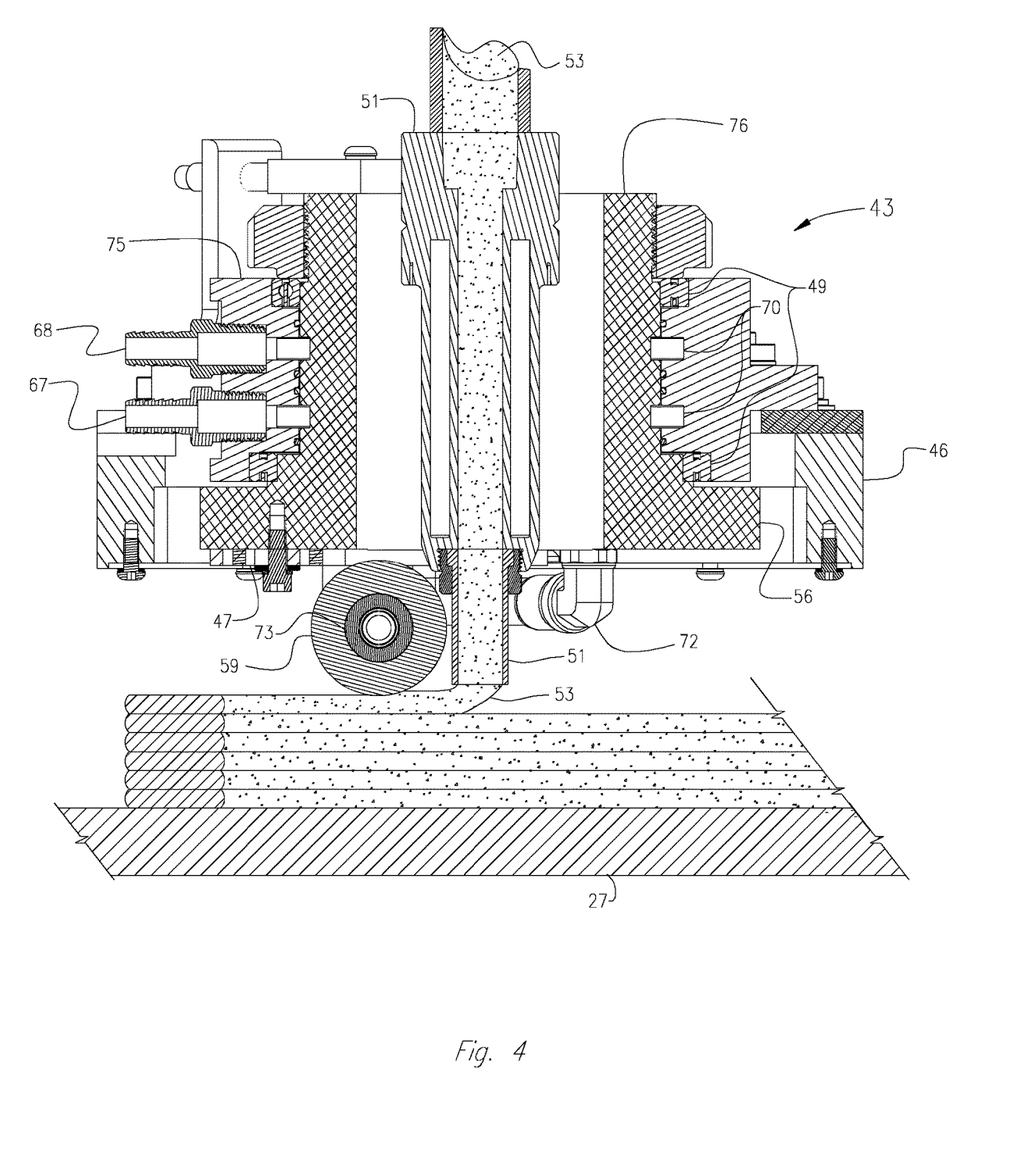
FIG. 4 is an enlarged cross-sectional view of the applicator head assembly shown in FIG. 3.

With reference to FIG. 4, applicator head 43 may include a housing 46 with rotary union mounted therein. Pulley or sprocket 56 may be machined into the inner hub 76 of the rotary union. An inner hub 76 may have an opening with a sufficiently large diameter to allow the heated print nozzle 51 to pass therethrough. Inner hub 76 may rotate on a set of bearings 49 contained within outer housing 75 of the rotary union. The compression roller assembly may be attached to the inner hub 76 of the rotary union so that the compression roller 59 rotates about the print nozzle 51. The rotary union may also contain barb fittings 67 and 68 ported into coolant passages 70 that encompass or surround inner hub 76 and the inside of the outer housing 75 of the rotary union. The coolant passages 70 may extend to quick disconnect fittings 72 into an axle 73 of the compression roller 59.

As best shown in FIGS. 2-4, an oversized molten bead of flowable material (e.g., molten thermoplastic) may be provided under pressure from a source disposed on carrier 25 (e.g., gear pump 62) or another source. The bead of flowable material may be provided to applicator head 43. Thus, gear pump 62, (or another source of flowable material), may be securely connected to, and in communication with, nozzle 51. In use, the flowable material 53 (e.g., thermoplastic material) may be heated sufficiently to form a large molten bead of material, which may be extruded through applicator nozzle 51 to form large, uniform, and smooth rows of deposited material on surface 27. Such beads of molten material may be flattened, leveled, and/or fused to adjoining layers with substantially no trapped air by bead-shaping compression roller 59 with the layers forming 3D printed products.

In some aspects, the speed by which an additive manufacturing apparatus, such as CNC machine 1, produces a part may depend, at least in part, on the speed at which each layer of deposited material cools, as well as a maximum output of the print head. The speed at which a layer cools may affect the speed at which the next layer may be deposited. For example, increasing a speed at which a layer cools may facilitate an increase in the speed at which the next layer can be printed or deposited on top of the existing (previously-deposited) layer. Thus, increasing the speed at which each layer cools may increase the speed at which a part can be printed. This may be beneficial as faster manufacturing times generally correspond to lower production costs. Therefore, in at least some embodiments, it may be desirable for layers to cool relatively faster. Exemplary approaches to accomplishing relatively faster cooling of one or more deposited beads and/or layers are described below.

A first exemplary approach for cooling a bead of material and/or one or more layers of material may include modifying the polymer or other deposited (e.g., printed) material to increase the thermal conductivity of the material. In at least some aspects, an increased thermal conductivity may allow the material to release heat at an increased rate, thereby cooling the material relatively quickly.

In some additive manufacturing processes, fillers, such as carbon fiber, may be added to polymer material. These fillers may improve one or more physical properties of the resulting polymer and filler mixture, or polymer and filler blend. While fillers may be included for the purpose of improved physical characteristics, such as reinforcement, improved tensile strength, reduced warpage, etc., these fillers, including fillers formed by or including reinforcement fibers, may also tend to increase the thermal conductivity of the resulting blended polymer. However, there may be a limit to the amount of such fillers that may be added to a base polymer. This limitation may be due to interactions between the polymer and reinforcement fibers of the filler material, for example.

Some fillers, such as graphite, various forms of graphite fiber, metal powders, fibers, or other suitable materials, may be added to a polymeric (e.g., thermoplastic) material, instead of, or in addition to, reinforcement fiber material. These fillers may be free of, or substantially free of, reinforcing fibers. In some aspects, graphite, metal powders, or related materials, may avoid one or more limitations that may be associated with the addition of further fiber reinforcement. While graphite, metal powder, or similar materials may not tend to improve physical properties of the mixed or blended or mixed material, they may be configured to substantially increase thermal conductivity of the blended material. Additionally, one or more types or variations of carbon fiber, having increased thermal conductivity, may be included in the blended material. Other methods or materials for increasing the thermal conductivity of the blended material (e.g., a blended polymer composite), may also be employed. Regardless of the precise method for increasing thermal conductivity of the material, the modified polymer may cool at a substantially faster rate as compared to traditional fiber-reinforced material when printed at room temperature.

In at least some aspects, a faster cooling rate may allow subsequent layers to be printed at a relatively faster rate. For example, by cooling one or more layers at a relatively faster rate (e.g., by increasing the thermal conductivity of the deposited material), overheating of the one or more layers of the material may be avoided, at least in part due to the ability of a deposited layer to cool at a relatively faster rate.

In some configurations, a faster cooling rate, may, however, tend to limit the overall size of part that may be printed using the modified (e.g., blended) polymer. For example, during additive manufacturing, layers of a printed part may be printed while the core of a previously-deposited layer retains sufficient heat such that the newly-deposited layer and the previously-deposited layer may fuse completely. The desire to deposit one or more layers while a previously-deposited layer retains this amount of heat may tend to limit the amount of time available for a particular polymer blend to cool. This period of time may extend from a time immediately after a layer, or portion of a layer, has been deposited or printed, and before a next layer, or portion of a layer, may be deposited thereon. Therefore, it may be desirable to ensure that an output of the print head (e.g., a rate at which the print head may be capable of depositing and/or extruding material) is sufficient to complete each layer in an available amount of time, to assure that fusing between adjacent layers occurs as desired.

In some aspects, an output of the print head (e.g., a maximum rate at which components of the print head, such as feed housing 40, extruder 61, and gear pump 62, allow the print head to deposit material) may not be sufficient to complete each layer in an amount of time available to facilitate complete fusing between each layer. Therefore, in order to ensure that inter-layer fusing occurs in a satisfactory manner, one or more components of the print head may be replaced to provide a print head with a larger maximum output. Additionally or alternatively, the cooling rate of the polymer may be reduced to increase the amount of time available to print the layer. However, one or more methods 90 (FIG. 5) and 92 (FIG. 6) may be employed to adjust the thermal conductivity of the polymer being printed such that, for a particular application, the cooling time or maximum available amount of time may closely correspond to the maximum output of a particular print head. In this way, the final part may be printed at the maximum possible speed corresponding to the print head output.

Figure 5:
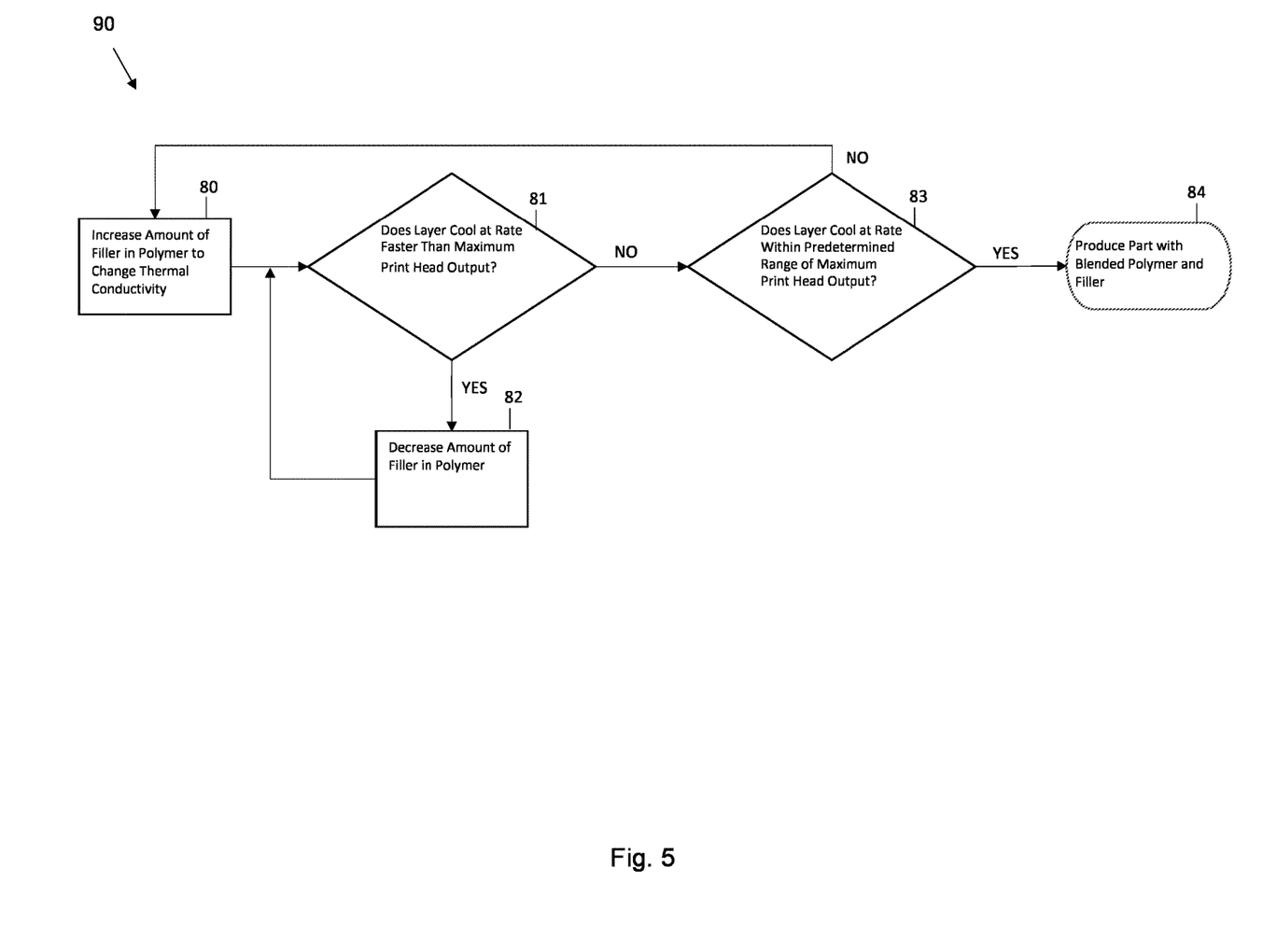
FIG. 5 is a flow chart for an exemplary process for maximizing cooling of a layer of deposited material to match a print head output.

With reference to FIG. 5, an exemplary method 90 may increase manufacturing speed while avoiding the need to replace one or more components of a print head (or a related assembly or part). In at least some embodiments, method 90 may include a step 80 during which one or more fillers are added to the polymer to improve thermal conductivity of the resulting polymer and filler mixture. The fillers in step 80 may include one or more materials that do not include reinforcing fibers. For example, step 80 may include the addition of at least one of carbon fiber, graphite, or a metallic material.

This blended or mixed polymer and filler may be evaluated in a step 81. For example, step 81 may include depositing one or more layers of the polymer and filler mixture formed in step 80. This deposition may be performed by providing the polymer and filler mixture or blend to the above-described additive manufacturing machine and thereafter depositing this material with the same machine. Step 81 may include determining whether the layer(s) of this polymer and filler mixture cools at a rate that exceeds the ability of the print head to deposit material. For example, step 81 may include determining a timing at which the deposited material reaches a predetermined lowest fusing temperature $Fuse_{Temp}$. Temperature $FUSe_{Temp}$ may correspond to a minimum, or coldest, temperature at which the layer of deposited material (e.g., the polymer and filler mixture deposited in step 80) will acceptably fuse with a subsequently-deposited warmer layer of material. For example, at the completion of a layer, if a portion (e.g., section) of the layer has a temperature that is less than $FUSe_{Temp}$, the maximum speed of the print head output 81 may be considered too slow for the polymer and filler material formed in step 80 (which has an increased thermal conductivity). In such a case, the mixed material may be considered to be cooling too quickly, and the determination in step 81 may be affirmative. In response to an affirmative determination (YES) in step 81, it may be possible to switch or replace one or more components of the print head with a higher output print head component. Moreover, it may be beneficial to decrease the amount of filler in the polymer 82, instead of, or in addition to, replacing a print head component.

For example, step 82 may include producing another (e.g., second or additional) mixture of polymer and filler. In one aspect, the mixture formed in step 82 may include less filler, in relation to polymer, in comparison to the mixture formed in step 80. Step 81 may be repeated with the second (or additional) mixture of polymer and filler formed in step 82.

When the mixed material formed in step 80 or 82 cools at a rate that facilitates substantially complete fusing between layers (e.g., the temperature of the deposited material is equal to or greater than $Fuse_{Temp}$ once an entire layer is deposited), the determination in step 81 may be negative (NO). For example, the determination in step 81 may be negative when the material evaluated in step 81 cools sufficiently slowly, such that the maximum output speed of the print head output facilitates complete fusing of the two layers.

Following a negative determination in step 81, a step 83 may be performed. Step 83 may include determining a timing $T_{support}$ during which an outer surface of the deposited layer of polymer and filler material has hardened to an extent that allows the deposited layer to physically support the next layer of material, while the temperature of the material remains above $Fuse_{Temp}$. This timing $T_{support}$ may be compared to the timing at which the print head, when operating at maximum output, is capable of depositing an entire layer. Thus, in some aspects, when the timing associated with $T_{support}$ is near (e.g., approximately equal to or within 10% of) a timing necessary for depositing the entire layer of material, manufacturing or print speed may be considered to be maximized. Step 83 may include determining whether the timing $T_{support}$ associated with cooling of the previously-deposited layer is within a predetermined or desired range with respect to the timing necessary to deposit an entire layer when the print head operates at maximum output.

If the determination in step 83 is negative (NO), the material and filler mixture may cool at a rate that significantly limits the speed at which a part may be manufactured. In such a case, the material may cool slowly with respect to the maximum output of the print head, requiring the print head to limit the speed of operation to ensure that the material cools sufficiently to support the next layer. Therefore, method 90 may return to step 80, in which additional filler may be added to the polymer material to increase thermal conductivity. Thereafter, step 83 (and, if desired, step 81) may again be performed.

If the determination in step 83 is affirmative (YES), the timing necessary to deposit material when the print head operates at maximum output corresponds to the amount of time $T_{Support}$ necessary for the deposited material to cool sufficiently to support an additional layer, while remaining above $Fuse_{Temp}$. Accordingly, the material formed by the mixture of polymer and filler may be sufficiently cool at a timing $T_{support}$ that matches, within a predetermined range, the time required for the print head to deposit a layer of material when operating at maximum output. In some aspects, the predetermined range of time may correspond to about 10% of the time necessary to deposit a layer of material when the print head operates at maximum output. However, other predetermined ranges, such as 5%, 15%, or 20%, may be employed as the predetermined range. As an example, for a print head that is capable of depositing an entire layer for a particular part in one minute (sixty seconds) when operating at maximum capacity, the predetermined range of timing $T_{support}$ may be in a range of about 54 seconds and about 66 seconds. This range may be satisfied when a deposited layer cools sufficiently to support the next layer, and remains above $Fuse_{Temp}$, approximately 54 second to about 66 seconds following deposition.

Following an affirmative determination in step 83, a step 84 may include manufacturing a complete part with the modified polymer and filler blend or mixture. Step 84 may include depositing material with a changed cooling rate at a deposition rate (or output) that is based at least in part on this changed cooling rate. For example, one or more parts 84 may be manufactured at substantially a maximum deposition rate based at least in part on the increased cooling rate. Step 84 may be performed using the additive manufacturing machine described above, for example.

Figure 6:
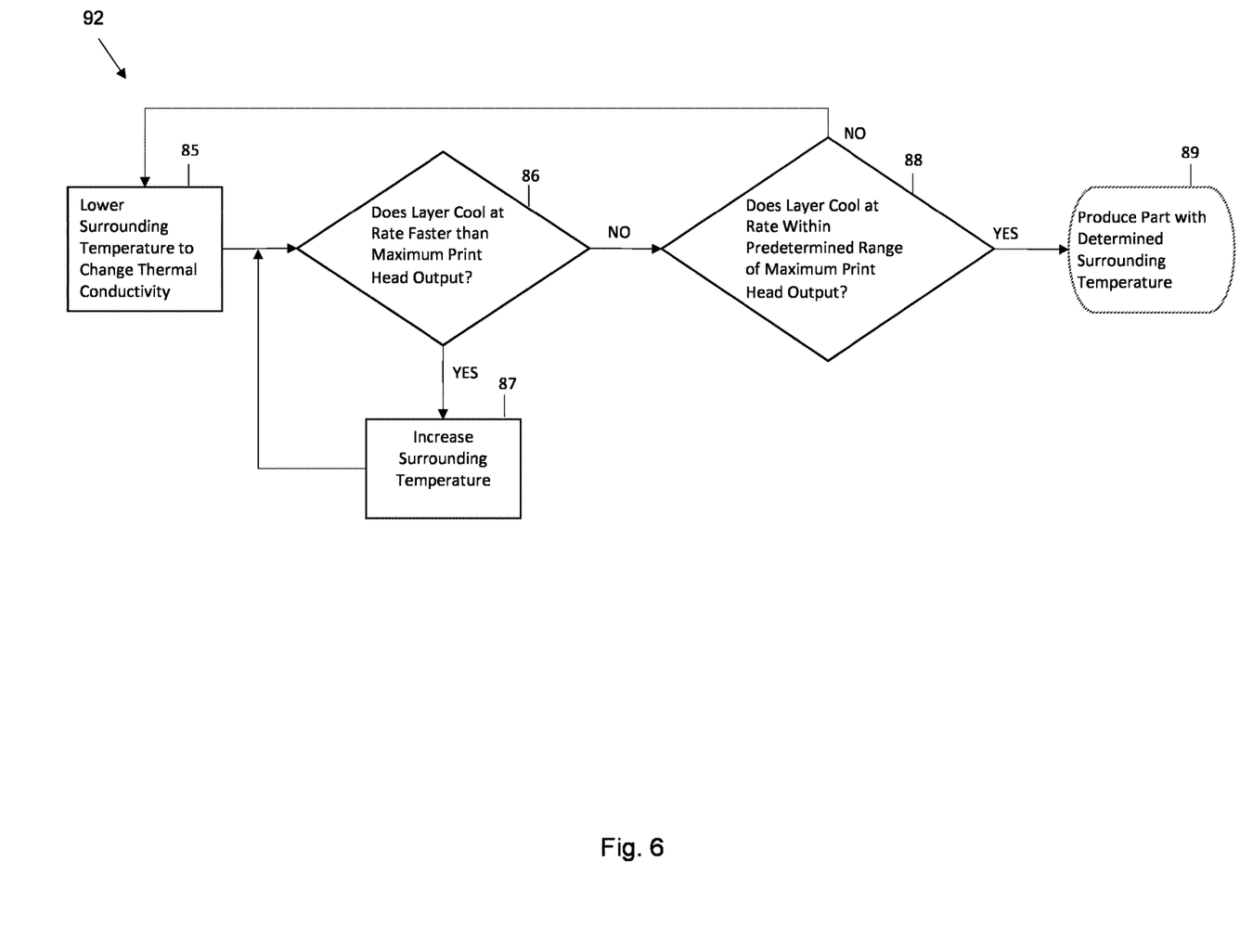
FIG. 6 is a flow chart for an exemplary process for maximizing cooling of a layer of deposited material to match a print head output by decreasing the surrounding temperature.

With reference to FIG. 6, an exemplary method 92 may include reducing the ambient temperature of air surrounding the deposited material, or a temperature of a work space of the additive manufacturing apparatus. For example, the temperature of a printing chamber or a deposition surface, such as surface 27, may be reduced such that the temperature at the location that receives the deposited material is cooled below an ambient temperature (e.g., a temperature that the environment reaches when cooling devices are not present or not activated). While it may be possible to include forced air circulation (e.g., one or more fans to cool the deposited material), this may be undesirable as some methods of circulating air may tend to cause somewhat uneven cooling, which may result in different areas of the part to cool at different rates. This differential in cooling rates may make it difficult, or in some cases impractical, to achieve steady-state cooling that facilitates optimum fusing of printed layers. A reduction in ambient air temperature, as an alternative, may allow natural (e.g., radiative, evaporative, etc.) cooling to occur relatively faster while generating a more even cooling across the part as compared to what is generally achievable with at least some types of forced air circulation. The reduction in ambient air temperature may be achieved by activating a cooling device, such as a device for supplying coolant or lowering air temperature, or increasing the amount of cooling achieved by such a cooling device. The approach of method 92 may facilitate relatively faster cooling of the outside of the bead to a temperature at or below a temperature at which an additional bead of material may be supported, thereby reducing $T_{support}$. In one aspect, such cooling may result in a solid crust or outer surface that is relatively thinner, but remains configured to support each subsequently-deposited layer, which may tend to result in a higher internal temperature of the deposited material. The subsequently-deposited print bead may, as a result, encounter less solid material that re-melts during the fusing process. Moreover, the subsequently-deposited bead may encounter a previously-deposited bead having a center that retains a relatively larger amount of heat, which may result in further improvements in the fusion between layers.

In particular, method 92 may include a step 85 in which the surrounding temperature is lowered. The effect of step 85, similar to step 80, may be to increase thermal conductivity of the deposited material (which may include polymer alone, or polymer and filler).

A step 86 of method 92 may be performed in the manner described with respect to step 81 of method 90. In particular, step 86 may include depositing one or more layers of material. Once layer(s) of this material are deposited, step 81 may include determining a timing at which the deposited material reaches a predetermined temperature $Fuse_{Temp}$, and comparing this timing to the timing at which the print head, when operating at maximum output, deposits an entire layer of material. If the layer cools (e.g., reaches a temperature below $Fuse_{Temp}$) before the print head, when operating at maximum output, completes a layer, the determination in step 86 may be affirmative (YES). In such a case, as described above, it may be possible to switch or replace one or more components of the print head with a higher-output print head component. However, the need to replace a print head component may be avoided, if desired, by instead increasing the surrounding temperature in a step 87. Step 87 may include depositing another (e.g., second or additional) layer of material to facilitate evaluation of the effect of the increased surrounding temperature on the timing at which the deposited layer reaches $Fuse_{Temp}$. Thus, step 86 may be repeated, as necessary to determine the effect of the temperature increase performed in step 87. As understood, while step 87 refers to an increased temperature, such a temperature may be relatively cold. For example, the temperatures established in steps 85 and/or 87 may correspond to room temperature (e.g., about 65 degrees Fahrenheit to about 85 degrees Fahrenheit), temperatures below room temperature (e.g., temperatures below about 65 degrees Fahrenheit), or other suitable temperatures.

When the deposited material cools at a rate that, as described above, facilitates substantially complete fusing, the determination in step 86 may be negative (e.g., as the layer does not cool faster than the maximum print head output), and step 88 may be performed. Following such a determination in step 86, method 92 may proceed to step 88. Step 88 may be performed in a similar manner as step 83 described above. For example, step 88 may include comparing timing $T_{support}$ at which the deposited layer of material has cooled sufficiently to physically support another layer of material (while remaining above $Fuse_{Temp}$), to the timing at which the print head, operating at maximum output, is configured to deposit an entire layer of material. In particular, step 88 may include determining whether the rate at which the deposited layer of material cools (as represented by timing $T_{support}$) is within a predetermined range with respect to the rate at which the print head is configured to deposit an entire layer when operating at its maximum output. This predetermined range may correspond to any of the above-described predetermined ranges.

When the determination in step 88 is negative, step 85 may be performed (or repeated) to lower the surrounding temperature by an additional amount. Following the second or additional reduction in temperature performed in step 85, step 86 may be performed, or method 92 may immediately return to step 88.

When the determination in step 88 is affirmative (YES), the modified (cooled) surrounding temperature may be well-matched to the maximum output of the print head. Thus, the amount of time necessary for the deposited layer to reach a suitable temperature (e.g., timing $T_{support}$), may be within a predetermined range of the amount of time needed for the print head to deposit a layer of material. Following an affirmative determination in step 88, the modified surrounding temperature may be applied when manufacturing a complete part with the above-described additive manufacturing apparatus in a step 89.

While exemplary methods 90 and 92 have been described as being separate methods, as understood, one or more steps of methods 90 and 92 may be performed together as part of a single method or manufacturing process for a part. For example, in order to form a layer of material that cools at a desired rate, it may be desirable to perform step 80 of method 90 to increase an amount of filler, thereby increasing thermal conductivity, and to also perform step 85 of method 92 to lower surrounding temperature, further increasing thermal conductivity of the deposited material. As understood, performing steps 80 and 85 together may reduce an amount of filler, and an amount of temperature reduction, that may be necessary to achieve a particular thermal conductivity.

From the foregoing detailed description, it will be evident that there are a number of changes, adaptations and modifications of the present disclosure which come within the province of those persons having ordinary skill in the art to which the aforementioned disclosure pertains. However, it is intended that all such variations not departing from the spirit of the disclosure be considered as within the scope thereof as limited by the appended claims.

What is claimed is:

1. An additive manufacturing method, comprising:
changing a cooling rate of a first amount of deposited material that includes a polymeric material by adding a first amount of a second material to the polymeric material, the cooling rate being a rate at which the deposited material cools after being deposited with an additive manufacturing apparatus;
providing the polymeric material and the first amount of the second material to the additive manufacturing apparatus;
depositing the polymeric material and the first amount of the second material with the additive manufacturing apparatus at a first deposition speed;
changing the cooling rate of a second amount of deposited material by adding a second amount of the second material to the polymeric material, the second amount being different than the first amount; and
further including increasing a maximum output of the additive manufacturing apparatus and depositing the polymeric material with the second amount of the second material with the additive manufacturing apparatus.

2. The additive manufacturing method of claim 1, wherein a thermal conductivity of the first amount of deposited material is changed by adding the second material, which includes at least one of carbon fiber, graphite, or a metallic material, to the polymeric material.

3. The additive manufacturing method of claim 1, wherein the second amount is greater than the first amount.

4. The additive manufacturing method of claim 3, wherein the second amount causes the cooling rate to increase.

5. The additive manufacturing method of claim 1, further including depositing the polymeric material with the second amount of the second material with the additive manufacturing apparatus at a second deposition speed that is greater than the first deposition speed.

6. The additive manufacturing method of claim 1, further including manufacturing a part by depositing the polymeric material with the second amount of the second material.

7. The additive manufacturing method of claim 1, further including reducing a temperature of an environment of the additive manufacturing apparatus.

8. The additive manufacturing method of claim 1, further including increasing the cooling rate of the deposited material by reducing a temperature at a location where the polymeric material is deposited.

9. The additive manufacturing method of claim 1, wherein the polymeric material is a thermoplastic material.

10. The additive manufacturing method of claim 1, wherein the polymeric material includes reinforcing fibers.

11. The additive manufacturing method of claim 1, further including manufacturing a mold or a tool by depositing the second amount of the second material.

12. An additive manufacturing method, comprising:
    changing a cooling rate of a first deposited material by adding a first amount of a second material to a first material, the cooling rate being a rate at which the first deposited material cools after being deposited with an additive manufacturing apparatus;
    providing the first material and the first amount of second material to an extruder of the additive manufacturing apparatus;
        depositing the first material and the first amount of the second material with the additive manufacturing apparatus to form the first deposited material;
    changing the cooling rate of a second deposited material by adding a second amount of the second material to the first material, the second amount being less than the first amount;
    depositing the first material and the second amount of the second material with the additive manufacturing apparatus to form the second deposited material; and
    increasing a maximum output of the additive manufacturing apparatus and depositing a polymeric material with the second amount of the second material with the additive manufacturing apparatus.

13. The additive manufacturing method of claim 12, wherein a thermal conductivity of the first material is changed by adding the second material, which includes at least one of carbon fiber, graphite, or a metallic material, to the first material.

14. The additive manufacturing method of claim 12, wherein the second material increases a thermal conductivity of mixture of the first material and the second material supplied to the additive manufacturing apparatus.

15. The additive manufacturing method of claim 12, further including depositing the first material and the second amount of the second material with a nozzle of the additive manufacturing apparatus at an increased deposition speed.

16. The additive manufacturing method of claim 12, further including manufacturing a mold or a tool by depositing the first material with the second amount of the second material.

17. The additive manufacturing method of claim 12, wherein the additive manufacturing apparatus includes a gear pump downstream of the extruder.

18. The additive manufacturing method of claim 12, further including increasing the cooling rate of the first material by reducing a temperature at a location where the second deposited material is deposited.

19. The additive manufacturing method of claim 12, wherein the polymeric material includes reinforcing fibers.

20. The additive manufacturing method of claim 12, further including reducing a temperature of an environment of the additive manufacturing apparatus.

* * * * *